(12) United States Patent
Meketa et al.

(10) Patent No.: US 10,580,220 B2
(45) Date of Patent: Mar. 3, 2020

(54) SELECTING ANIMATION MANIPULATORS VIA ROLLOVER AND DOT MANIPULATORS

(71) Applicant: Pixar, Emeryville, CA (US)

(72) Inventors: Deneb Meketa, Emeryville, CA (US); Jeremie Talbot, Emeryville, CA (US); Bret Parker, Emeryville, CA (US); Guilherme S. Jacinto, Emeryville, CA (US); Bernhard Ulrich Haux, Emeryville, CA (US)

(73) Assignee: Pixar, Emeryville, CA (US)

( * ) Notice: Subject to any disclaimer, the term of this patent is extended or adjusted under 35 U.S.C. 154(b) by 100 days.

(21) Appl. No.: 14/638,840

(22) Filed: Mar. 4, 2015

(65) Prior Publication Data
US 2016/0260240 A1 Sep. 8, 2016

(51) Int. Cl.
*G06T 19/20* (2011.01)
*G06F 3/0484* (2013.01)

(52) U.S. Cl.
CPC .......... *G06T 19/20* (2013.01); *G06F 3/04842* (2013.01); *G06T 2219/2016* (2013.01); *G06T 2219/2021* (2013.01)

(58) Field of Classification Search
CPC ..................................................... G06T 13/20
See application file for complete search history.

(56) References Cited

U.S. PATENT DOCUMENTS

| 6,091,415 A * | 7/2000 | Chang | G06F 3/0481 |
| | | | 715/809 |
| 2005/0166148 A1* | 7/2005 | Garding | G06F 9/4446 |
| | | | 715/708 |
| 2006/0274070 A1* | 12/2006 | Herman | A63F 13/10 |
| | | | 345/474 |
| 2008/0101682 A1* | 5/2008 | Blanford | G01B 11/005 |
| | | | 382/141 |
| 2009/0096808 A1* | 4/2009 | Winn | G06T 11/60 |
| | | | 345/594 |
| 2010/0122194 A1* | 5/2010 | Rogers | G06F 3/04817 |
| | | | 715/769 |
| 2014/0172864 A1* | 6/2014 | Shum | G06F 19/322 |
| | | | 707/740 |
| 2015/0160794 A1* | 6/2015 | Huang | G06F 3/0482 |
| | | | 715/810 |
| 2016/0081659 A1* | 3/2016 | Perrey | A61B 8/463 |
| | | | 600/449 |
| 2016/0092080 A1* | 3/2016 | Swanson | G06F 3/04845 |
| | | | 345/654 |

* cited by examiner

*Primary Examiner* — Grace Q Li
(74) *Attorney, Agent, or Firm* — Patterson + Sheridan, LLP

(57) ABSTRACT

One embodiment of the present application includes an approach by which an animation system manipulates an animatable object. The animation system detects that a pointer device has positioned a pointer location at a first location, the first location coinciding with a first portion of geometry of the animatable object. The animation system indicates that a first manipulator associated with the first portion of geometry is tentatively selected. Prior to receiving a selection event from the pointer device, the animation system displays a representation of the first manipulator.

4 Claims, 10 Drawing Sheets

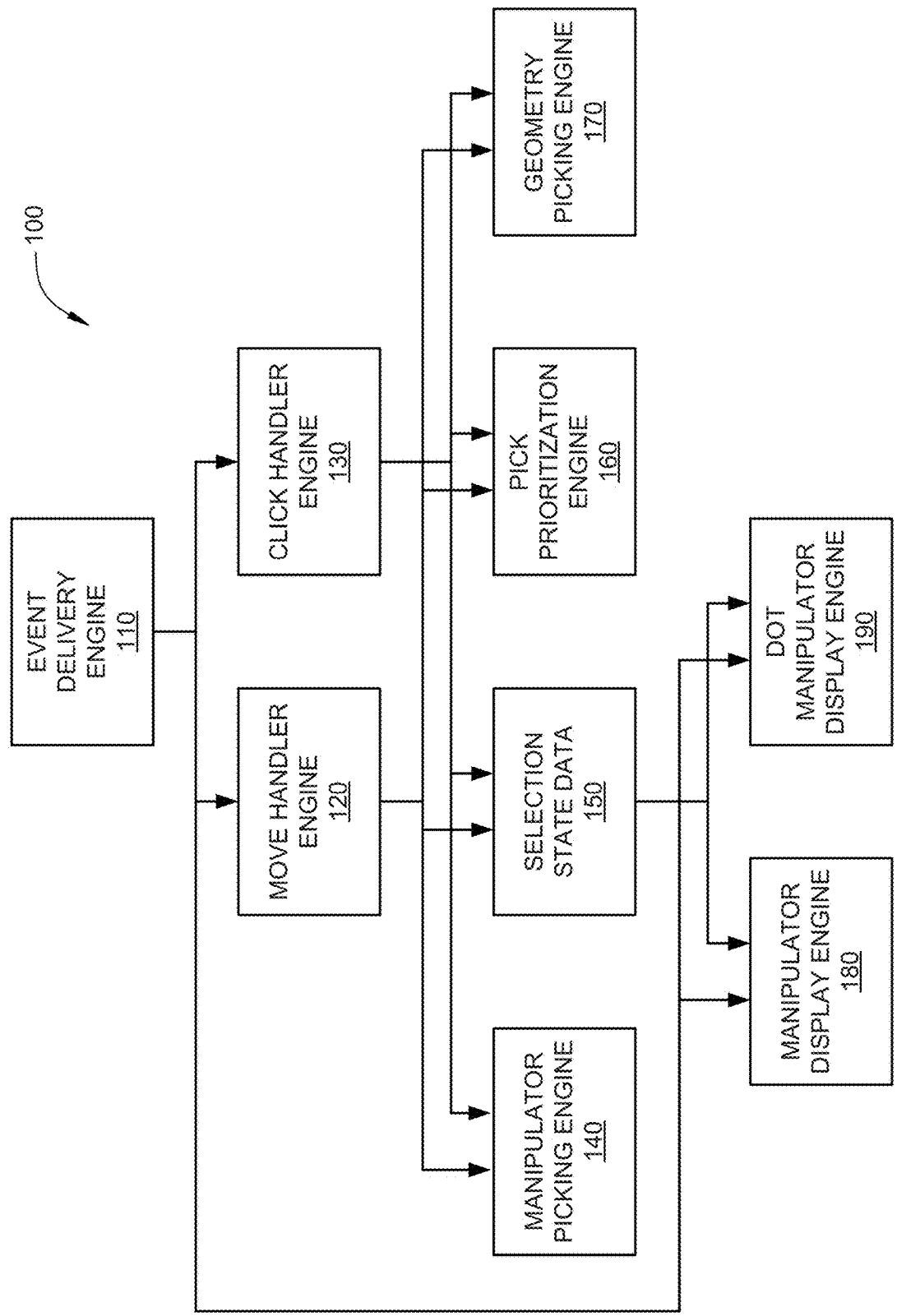

SELECTING ANIMATION MANIPULATORS VIA ROLLOVER AND DOT MANIPULATORS

FIELD

The present disclosure relates to the field of computer animation and, in particular, to selecting animation manipulators via rollover and dot manipulators.

BACKGROUND

Description of the Related Art

In computer animation, a 3D object, such as an animatable character, is first modeled, via a static 3D mesh to represent the 3D object. The modeled 3D object is then bound, or attached, to a system of joints, bones, and control handles to prepare the object for animation, a process known as rigging. Once the object is rigged, one or more animators define motions of the various joints, bones, and control handles to cause the rigged object to perform a variety of motions as appropriate for the character, such as walking, running, crawling, and motions of the mouth, as when smiling, laughing, or speaking.

To animate a 3D object, an animator typically performs many thousands of manipulations to cause the object to perform the various functions in various scenes in a smooth and believable manner. These manipulations are performed by selecting and moving various "manipulators," where each manipulator causes a portion of the 3D object to change position, rotation, scale up or down, and so on. Typically, manipulators appear as three-dimensional (3D) user interface elements with handles that may be moved or dragged to change various parameters associated with the corresponding manipulator. In general, the animator selects a portion of geometry of the 3D object via a graphical user interface associated with an animation application program, where the selection causes one or more manipulators associated with the geometry to appear. The animator then selects one of the manipulators and performs a function on the manipulator, such as dragging, in order to move, rotate, or scale the associated portion of geometry. The animator continues this process for each keyframe in the animation to cause the 3D object to move in the desired manner.

One potential drawback with this approach is that multiple selections are needed for each movement of each portion of geometry, which, in the aggregate, makes the animation of a 3D object a fairly slow and tedious process. For example, to adjust a particular manipulator handle associated with a portion of geometry, an animator would first have to click on the portion of geometry, causing the manipulator to become visible. The animator would then have to click on a particular manipulator handle, and then drag the handle as desired. That is, two click selects would be required before the manipulator handle could be dragged. Further, because of the significant quantity of selections during animation, animators may experience fatigue or even repetitive stress injury (RSI). Another drawback with this approach is that the animator does not see which manipulators correspond to a particular portion of the geometry until the geometry is first selected. As a result, when an animator encounters an unfamiliar 3D object, the animator starts by clicking on or otherwise selecting on various portions of geometry in order to become familiar with the location and functions of each manipulator for each particular portion of geometry, thereby further slowing the actual animation process.

SUMMARY

One embodiment of the present application includes a method for manipulating an animatable object. The method includes detecting that a pointer device has positioned a pointer location at a first location, the first location coinciding with a first portion of geometry of the animatable object. The method further indicating that a first manipulator associated with the first portion of geometry is tentatively selected. The method further, prior to receiving a selection event from the pointer device, displaying a representation of the first manipulator.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 is a block diagram of an animation system, according to one embodiment;

DETAILED DESCRIPTION

Figure 2A:
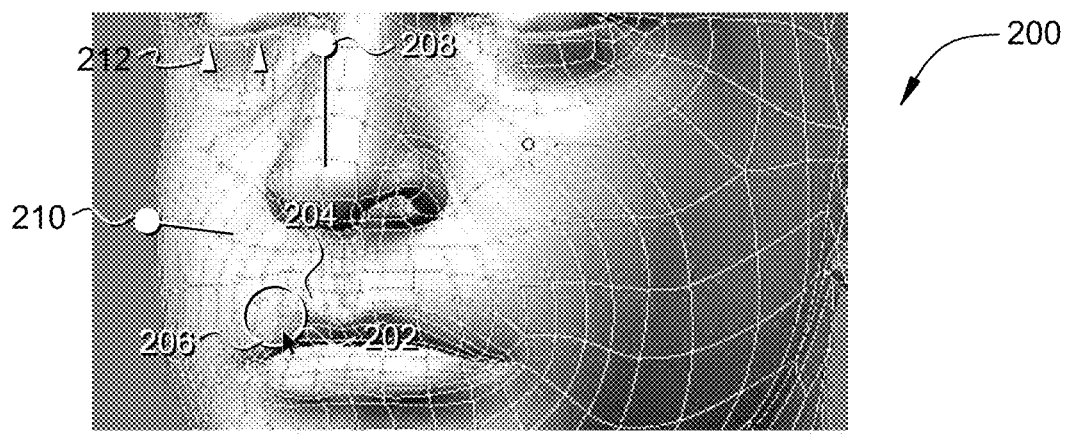
FIGS. 2A-2C illustrate a portion of an animatable 3D object, according to one embodiment.

Embodiments presented herein provide techniques for displaying manipulators in an animation system. In general, manipulators are control handles whereby an animator or other user controls, or manipulates, parameters associated with an animatable object (e.g., a 3D model in a 3D space presented on a computing device), typically via a graphical user interface. Manipulators control various aspects of an animatable object, including, without limitation, the size, position, orientation, shape, and rotation of the animatable object.

In particular, embodiments presented herein provide techniques for an animation system to display standard, rollover, and dot manipulators in response to events preformed using a pointer device. A standard manipulator is a manipulator that has been selected via a click or some other event associated with a pointer device. The standard manipulator can be selected via any technically feasible technique, including, without limitation, a press of a mouse or trackball button, a press of a stylus on the surface of a digital drawing tablet, a press of a finger on a touch screen, movement of a pointer over an area, etc. In some embodiments, upon selection of a standard manipulator, a user may interact with the manipulator to modify or otherwise manipulate the geometry of an associated animatable object. The types of interaction options may be limited to a predefined set for a manipulator. For example, a particular manipulator may only allow movement of a piece of geometry along an x or y axis. Different manipulators may have different sets of predefined interaction options. A rollover manipulator is a manipulator that has been tentatively selected via a move event associated with a pointer device. The rollover manipulator can be selected via any technically feasible technique, including, without limitation, a movement of a mouse along a surface, a movement of a stylus across the surface of a digital drawing tablet, a rolling of a trackball in a trackball device, or a movement of a finger along the surface of a touch screen. A dot manipulator is a manipulator that is associated with one or more other dot manipulators. The dot manipulator may appear as a circle or sphere on a graphical user interface presented to a user for editing an animatable object. In some embodiments, if a pointer is positioned over any dot manipulator in a group of associated dot manipulators, each of the dot manipulators in the group are simultaneously available for rollover or standard selection.

In one embodiment, a current position of the pointer device may be tracked in relationship to portions of geometry and associated manipulators. As the pointer device moves to a location nearby a particular portion of geometry, the animation system may highlight the portion of geometry. The animation system may also display a manipulator (e.g. a particular 3D user interface component) associated with the portion of geometry when the pointer device "rolls over" the portion of geometry. This manipulator is referred to herein as a rollover manipulator. As the pointer device moves over different portions of geometry, different rollover manipulators may be displayed.

If a rollover manipulator is clicked on or otherwise selected using the pointer device, the animation system may promote the rollover manipulator to a standard manipulator and highlight the standard manipulator (indicating the manipulator has been selected and is active). The system may also display handles associated with the standard manipulator. The pointer device may be used to manipulate a portion of geometry via the handles of the manipulator, where a manipulator handle is a subcomponent of a manipulator that may be dragged or moved to adjust one or more parameters associated with the 3D object. As the pointer device moves to other portions of geometry, associated rollover manipulators may be displayed while the previously selected standard manipulator may continue to be displayed and highlighted. Doing so allows the animator to observe what manipulators are available for each portion of geometry by moving a pointer to that portion, without also having to first select a portion of geometry.

In another embodiment, a current position of the pointer device may be tracked in relationship to portions of geometry and associated manipulators. As the pointer device moves over a particular portion of geometry, the animation system may highlight that portion of geometry in response. The animation system may also determine that two (or more) manipulators are available for the highlighted portion of geometry. For example, the animation system may display a group of indicators (e.g., circles or spheres), each representing a different manipulator. Such indicators are referred to herein as dot manipulators. As the pointer moves over as each indicator, the associated dot manipulator may be promoted to the current rollover manipulator. The current rollover manipulator is processed as described above. In this fashion, the animator may be able to observe various groups of manipulators for each portion of geometry by moving the pointer device without having to first select a portion of geometry.

In yet another embodiment, a current position of the pointer device may be tracked in relationship to both the particular portion of geometry at the current position of the pointer device, and also to other related portions of geometry and the manipulators associated with these other related portions of geometry. As the pointer device moves over any one of the related portions of geometry, the animation system may highlight one of the related portions of geometry that has been designated as the primary portion of geometry in the group. The animation system may also determine the total set of manipulators that are available for the all of the related portions of geometry. For example, the animation system could detect that the current position of the pointer device is over a portion of geometry within the lips of an animatable object, where the lips could be divided into six related portions of geometry: left, center, and right portions of the upper lip and left, center, and right portions of the lower lip. The center portion of the upper lip could be designated as the primary portion of geometry for the pair of lips. If the current position of the pointer device is over any of the six portions of geometry included in the pair of lips, then the center portion of the upper lip is highlighted, and dot manipulators are displayed for each manipulator associated with any of the six related portions of geometry.

In yet another embodiment, dot manipulators may be promoted to rollover manipulators according to one of two modes, as determined via a user selection or user preference. In a first mode, a dot manipulator is promoted to a rollover manipulator as soon as the pointer device rolls over a location that intersects with an indicator associated with the dot manipulator. In this mode, manipulators are displayed and removed as the pointer moves over the various indicators associated with a group of dot manipulators. If the rollover manipulator is clicked on, then the rollover manipulator is promoted to a standard manipulator. In a second mode, a dot manipulator is not promoted to a rollover manipulator, as in the first mode, but the dot manipulator is promoted directly to a standard manipulator after the dot manipulator is clicked on or otherwise selected. In this mode, only the indicators are displayed as the pointer moves over the dot manipulators in a group. The standard manipulator is not displayed until a dot manipulator is actually clicked on.

By tracking standard selections and rollover selections of standard manipulators, rollover manipulators, and dot manipulators, the techniques described herein provide a system for animators to efficiently manipulate various parameters for portions of geometry included in an animatable object, while reducing the quantity of pointer device clicks needed to perform the animation.

Note, embodiments of the present disclosure are described below using a standalone animation system as an example of an application which employs dot manipulators in an animation application program. As described, the animation system displays standard, rollover, and dot manipulators in response to move events and click events associated with a pointer device. One of ordinary skill in the art will recognize that embodiments described herein may be adapted to work with a variety of computing applications which support animation of 3D objects via manipulators. For example, embodiments may be used with virtualized systems and infrastructure, stand-alone computing appliances, network devices, data storage devices, and unconventional network-aware devices capable of performing one or more of the techniques described herein.

In the following description, numerous specific details are set forth to provide a more thorough understanding of the present disclosure. However, it will be apparent to one of skill in the art that the present disclosure may be practiced without one or more of these specific details.

FIG. 1 is a block diagram of an animation system 100, according to one embodiment. As shown, the animation system includes, without limitation, an event delivery engine 110, a move handler engine 120, a click handler engine 130, a manipulator picking engine 140, selection state data 150, a pick prioritization engine 160, a geometry picking engine 170, a manipulator display engine 180, and a dot manipulator display engine 190.

The event delivery engine 110 detects and reports various on the occurrence of events associated with an input device or an output device. For example, the event delivery engine 110 could detect and report move events, click events, key-press events, and paint events.

A move event occurs when a pointer device changes position, where a pointer device includes, without limitation, a mouse, a digital drawing tablet, a touch screen, and a trackball device. A move event includes, without limitation, a movement of a mouse along a surface, a movement of a stylus across the surface of a digital drawing tablet, a rolling of a trackball in a trackball device, or a movement of a finger along the surface of a touch screen. A click event occurs when a button or other actuator on a pointer device is actuated. A click event includes, without limitation, a press of a mouse or trackball button, a press of a stylus on the surface of a digital drawing tablet, or a press of a finger on a touch screen. A key-press event occurs when a key on a keyboard is pressed.

A paint event occurs when an application requests that graphical data be written to a display memory. The contents of the display memory are then retrieved and displayed on a display device. A paint event includes, without limitation, a request to draw a portion of geometry or a graphical user interface element to the display memory. In one embodiment, paint events may result in manipulators and dot manipulators being displayed on the display device. The event delivery engine 110 transmits move events to the move handler engine 120, click events to the click handler engine 130, and paint events to the manipulator display engine 180 and the dot manipulator display engine 190. In some embodiments, various engines in the animation system 100 subscribe to one or more of the events detected and reported by the event delivery engine 110. For example, the move handler engine 120 could subscribe to move events, the click handler engine 130 could subscribe to click events, and the manipulator display engine 180 and the dot manipulator display engine 190 could subscribe to paint events.

The move handler engine 120 receives move events from the event delivery engine 110. The move handler engine 120 detects when, as a result of a move event, a current position associated with the pointer device is over either a particular portion of geometry or over a manipulator, where a manipulator includes a standard manipulator or a dot manipulator. Such an occurrence is referred to herein as a rollover, where the current pointer location "rolls" over a portion of geometry or a manipulator. A rollover where the current pointer location is over a central region of a portion of geometry is considered to be a rollover selection of that portion of geometry. A rollover where the current pointer location is over a perimeter region of a portion of geometry is considered to be a tentative rollover selection of that portion of geometry. Stated another way, if the move handler engine 120 detects that the current pointer location has rolled over a central region or a perimeter region of a particular portion of geometry, then that portion of geometry is said to be rollover selected or tentatively rollover selected, respectively. The move handler engine 120 determines, based on received move events, which standard manipulators and dot manipulators to select and display. That is, when the current pointer location rolls over a portion of geometry, the move handler engine 120 determines whether and what types of manipulators to display.

In some embodiments, determining which manipulators to display may be based in part on user settings or preferences. In such embodiments, a user may select to display standard manipulators, dot manipulators, or both standard and dot manipulators. The move handler engine 120 transmits information about geometry and manipulators to the manipulator picking engine 140, the pick prioritization engine 160, and the geometry picking engine 170 for processing and receives results of this processing from the engines. The move handler engine 120 stores information regarding tentative selections in the selection state data 150.

The click handler engine 130 receives click events from the event delivery engine 110. The click handler engine 130 detects when an actuator of a pointer device has been activated at a position that is over either a particular portion of geometry or over a manipulator, (e.g., a standard manipulator or a dot manipulator). Such an occurrence is referred to herein as a click event, where the pointer device clicks on or otherwise selects a portion of geometry or a manipulator. As used herein, the terms "click on" and "select" are used interchangeably. The portion of geometry or manipulator can be selected via any technically feasible technique, including, without limitation, a press of a mouse or trackball button, a press of a stylus on the surface of a digital drawing tablet, or a press of a finger on a touch screen. A click selection is considered to be a standard selection of an associated portion of geometry. Stated another way, if the click handler engine 130 detects that the pointer device has click selected a particular portion of geometry (referred to herein as a standard selection), then that portion of geometry is said to be selected. The click handler engine 130 determines, based on received click events, which standard manipulators and dot manipulators to select and display on the display device. When the user clicks on a portion of geometry, the click handler engine 130 determines whether and what types of manipulators to display.

In some embodiments, such a determination of may be based on user settings or user preferences. For example, a user could specify preferences for selecting and displaying standard manipulators, dot manipulators, or both standard and dot manipulators. The click handler engine 130 transmits information about geometry and manipulators to the manipulator picking engine 140, the pick prioritization engine 160, and the geometry picking engine 170 for processing, and receives results of this processing from the engines. The click handler engine 130 stores information regarding standard selections in the selection state data 150.

The manipulator picking engine 140 receives a particular pixel location of interest, typically the current pointer location, from the move handler engine 120 or the click handler engine 130. The manipulator picking engine 140 determines, for the particular pixel location of interest, whether one or more manipulators has been drawn at the particular pixel location. If two or more manipulators intersect the particular pixel location, the manipulator picking engine 140 compares depth information, also referred to herein as z information, associated the two or more manipulators in order to determine which manipulator is closest to the viewpoint of a given virtual display camera within the 3D space that includes the animatable object.

The selection state data 150 stores information regarding standard selections, rollover selections, and tentative rollover selections, as determined by the move handler engine 120 and the click handler engine 130. The standard selection refers to one or more manipulators that have been clicked on or otherwise selected using the pointer device. Rollover selection information refers to a manipulator, where the pointer device is directly over an manipulator associated with a particular portion of geometry. Tentative rollover selection information refers to a manipulator that is tentatively selected when the pointer device is over an edge region of a portion of geometry, but the pointer device is not directly over the associated manipulator itself.

In one example, the pointer could be positioned such that the pointer is not over any manipulator or portion of geometry. This condition would be reflected in the selection state data 150 as a state where standard selection, rollover selection, and tentative rollover selection are all cleared. If the pointer moves to a position over an edge area of a portion of geometry, but not directly over a manipulator, the tentative rollover selection of the selection state data 150 would be updated to show that a corresponding manipulator is tentatively selected via rollover. If the pointer now moves to a position directly over a manipulator associated with the portion of geometry, the tentative rollover selection of the selection state data 150 would be cleared and the rollover selection of the selection state data 150 would be updated to show that a corresponding manipulator is selected via rollover. If the pointer device now clicks on or otherwise selects the manipulator associated with the portion of geometry, the tentative rollover selection and rollover selection of the selection state data 150 would both be cleared and the standard selection of the selection state data 150 would be updated to show that a corresponding manipulator is selected via a click event.

In another example, the pointer device could move directly from a position where the pointer is not over any manipulator or portion of geometry to a position directly over a manipulator associated with a portion of geometry. In such cases, the selection state data 150 would be updated from a condition where standard selection state, rollover selection state, and tentative rollover selection state are all clear to a condition where the rollover selection is set to indicate the manipulator. In such a case, the selection state data 150 would transition directly from an all clear state to a rollover selection state without first passing through the tentative rollover selection state.

The pick prioritization engine 160 receives a particular pixel location of interest from the move handler engine 120 or the click handler engine 130. If two or more manipulators intersect at the particular pixel location, the pick prioritization engine 160 determines which manipulator to activate.

As described herein, the pick prioritization engine 160 determines which manipulator to activate based on the depth information for each manipulator as well as the type of manipulator (e.g., standard manipulators, rollover manipulators, and dot manipulators). In one example, standard manipulators could be preferred over rollover manipulators, and, in turn, rollover manipulators could be preferred over dot manipulators. In some embodiments, if two dot manipulators intersect at a particular pixel location, the pick prioritization engine 160 may select the smaller of the two dot manipulators. In this way, when two dot manipulators are centered on the same pixel location, the selection region forms a "bullseye" pattern where selecting a pixel in the center region of the bullseye may select the smaller of the two dot manipulators. Selecting a pixel in the ring-shaped region just outside of this center region and still within the bounds of the larger dot manipulator may select the larger of the two dot manipulators.

The geometry picking engine 170 receives a particular pixel location of interest from the move handler engine 120 or the click handler engine 130. The geometry picking engine 170 determines, for the particular pixel location of interest, whether one or more portions of geometry has been drawn at the particular pixel location. Typically, the particular pixel location is a pixel location corresponding to the current pointer location. If two or more portions of geometry intersect the particular pixel location, the geometry picking engine 170 compares depth information, also referred to herein as z information, associated with the two or more portions of geometry in order to determine which portion of geometry is closest to the surface of the display device.

The manipulator display engine 180 receives paint events from the event delivery engine 110. From these paint events, the manipulator display engine 180 determines how to draw corresponding one or more standard manipulators, including how the one or more manipulators appear on the graphical user interface of an animation application program. For example, a move manipulator could appear as a ring near the center of the manipulator with two arrows at right angles to each other. The two arrows would correspond to movement of the associated portion of geometry in a two-dimension space defined by the two arrows. Upon receiving a paint event, the manipulator display engine 180 retrieves information from the selection state data 150 to determine which, if any, of one or more standard manipulators to display. Based on the selection state data, the manipulator display engine 180 determines the specific manipulator to display, a location where to draw the manipulator in 3D space relative to the associated animatable object, and a graphical representation appropriate for the particular manipulator.

The dot manipulator display engine 190 receives paint events from the event delivery engine 110. From these paint events, the dot manipulator display engine 190 determines how to draw corresponding one or more dot manipulators, including how the one or more manipulators appear on the graphical user interface of an animation application program. For example, several dot manipulators could appear for a particular portion of geometry, corresponding to standard manipulators that control movement, rotation, or scale of the associated portion of geometry. Upon receiving a paint event, the dot manipulator display engine 190 retrieves information from the selection state data 150 to determine which, if any, of one or more dot manipulators to display. Based on the selection state data, the dot manipulator display engine 190 determines the specific dot manipulators to display, a location where to draw the dot manipulators in display memory, and a graphical representation appropriate for the particular dot manipulators.

Figure 2B:
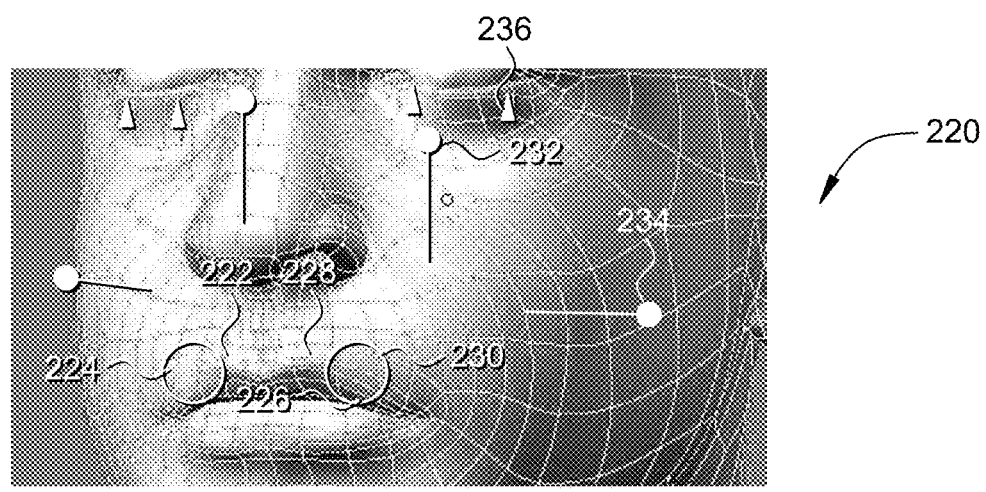
Figure 2C:
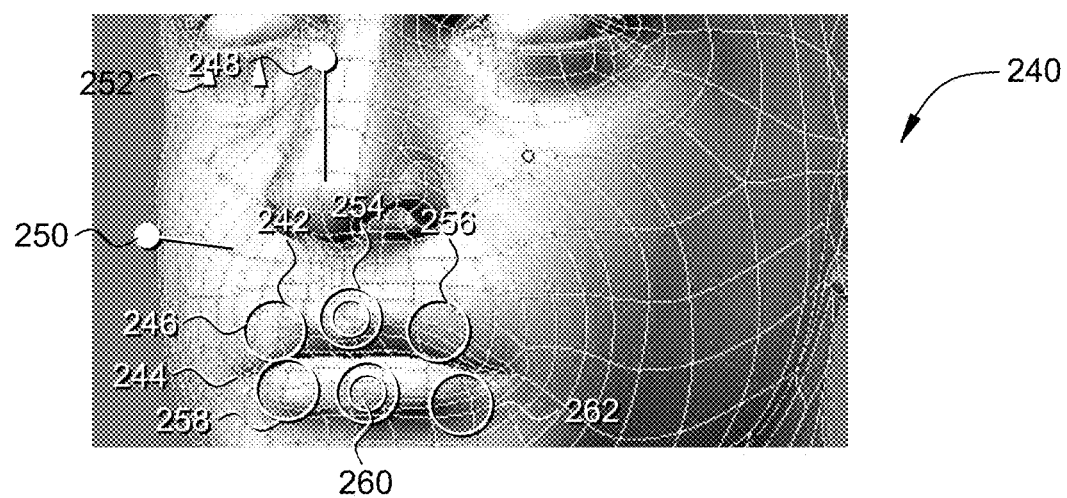

FIGS. 2A-2C illustrate a portion of a 3D object, according to one embodiment. As shown in FIG. 2A, 3D object 200 includes various portions of geometry, such as portion of geometry 202. The pointer location, or cursor, 204 is placed over the portion of geometry 202 at a point associated with manipulator 206. The manipulator 206 and associated handles 208, 210, and 212 may be highlighted as soon as the pointer 204 moves across or "rolls over" the portion of geometry 202. The manipulator handles 208, 210, and 212 control parameters associated with the portion of geometry 202. For example, selecting and dragging manipulator handle 208 could move the portion of geometry 202 in a horizontal direction, selecting and dragging manipulator handle 210 could move the portion of geometry 202 in a vertical direction, and selecting and dragging manipulator handle 212 could change a different parameter associated with the portion of geometry 202. Selecting and dragging the manipulator 206 could move the portion of geometry 202 simultaneously in a vertical direction and a horizontal direction.

As shown in FIG. 2B, 3D object 220 includes various portions of geometry, such as portion of geometry 222 and 228. In this example, the manipulator 224 has been clicked on and the pointer location 226 has now rolled over the manipulator 230 associated with portion of geometry 228. As a result, both manipulators 224 and 230 are displayed and both portions of geometry 222 and 228 are highlighted. Manipulator 224 and portion of geometry 222 are associated with a standard selection, indicating the portion of geometry 222 has been clicked on. Manipulator 230 and portion of geometry 228 are associated with a rollover selection, indicating the portion of geometry 228 has been rolled over. Manipulator 230 is associated three manipulator handles 232, 234, and 236.

As shown in FIG. 2C, 3D object 220 includes various portions of geometry, such as portion of geometry 244. In this example, the portion of geometry 244 is associated with a group of dot manipulators 246, 254, 256, 258, 260, and 262. Because the pointer location 242 is over manipulator 246, the manipulator handles 248, 250, and 252 are also displayed. The pointer location 242 is free to move over the dot manipulators 246, 254, 256, 258, 260, and 262, while the dot manipulators 246, 254, 256, 258, 260, and 262 continue to be displayed. If the pointer location 242 is over one of the dot manipulators 246, 254, 256, 258, 260, and 262, then the corresponding manipulator handles are also displayed. Dot manipulators 254 and 260 are shown as "bullseye" indicators to illustrate that each of these dot manipulators 254 and 260 each include two actuators for two separate dot manipulators. Selecting the center region selects the smaller of the two dot manipulators while selecting the ringed region just outside of the center region selects the larger of the two dot manipulators.

Various techniques for selecting and displaying the manipulators illustrated in FIG. 2 are now described. Move events are detected and processed in order to determine whether a rollover selection or a tentative rollover selection is indicated, as described in conjunction with FIGS. 3A-3C. Rollover selections and tentative rollover selections cause one or more rollover manipulators or dot manipulators to be displayed. Such manipulators provide an animator with the ability to change animation parameters without having to first click on or otherwise select a portion of geometry. Click events are detected and processed in order to determine whether a standard selection is indicated, as described in conjunction with FIGS. 4A-4B. Standard selections cause one or more standard manipulators or dot manipulators to be displayed. Such manipulators provide an animator with the ability to change animation parameters after clicking on a portion of geometry. When a move event or click event is associated with a pointer location that intersects with multiple manipulators, the pick prioritization engine 160 determines which one of the multiple manipulators is the highest priority manipulator according to a defined relative priority order, as described in conjunction with FIG. 5. When a paint event is detected, one or more standard manipulators, rollover manipulators, and dot manipulators are displayed, as described in conjunction with FIG. 6. The determination as to which manipulators to display is based at least in part on the standard selection, rollover selection, and tentative rollover selection information stored in the selection state data 150.

Figure 3A:
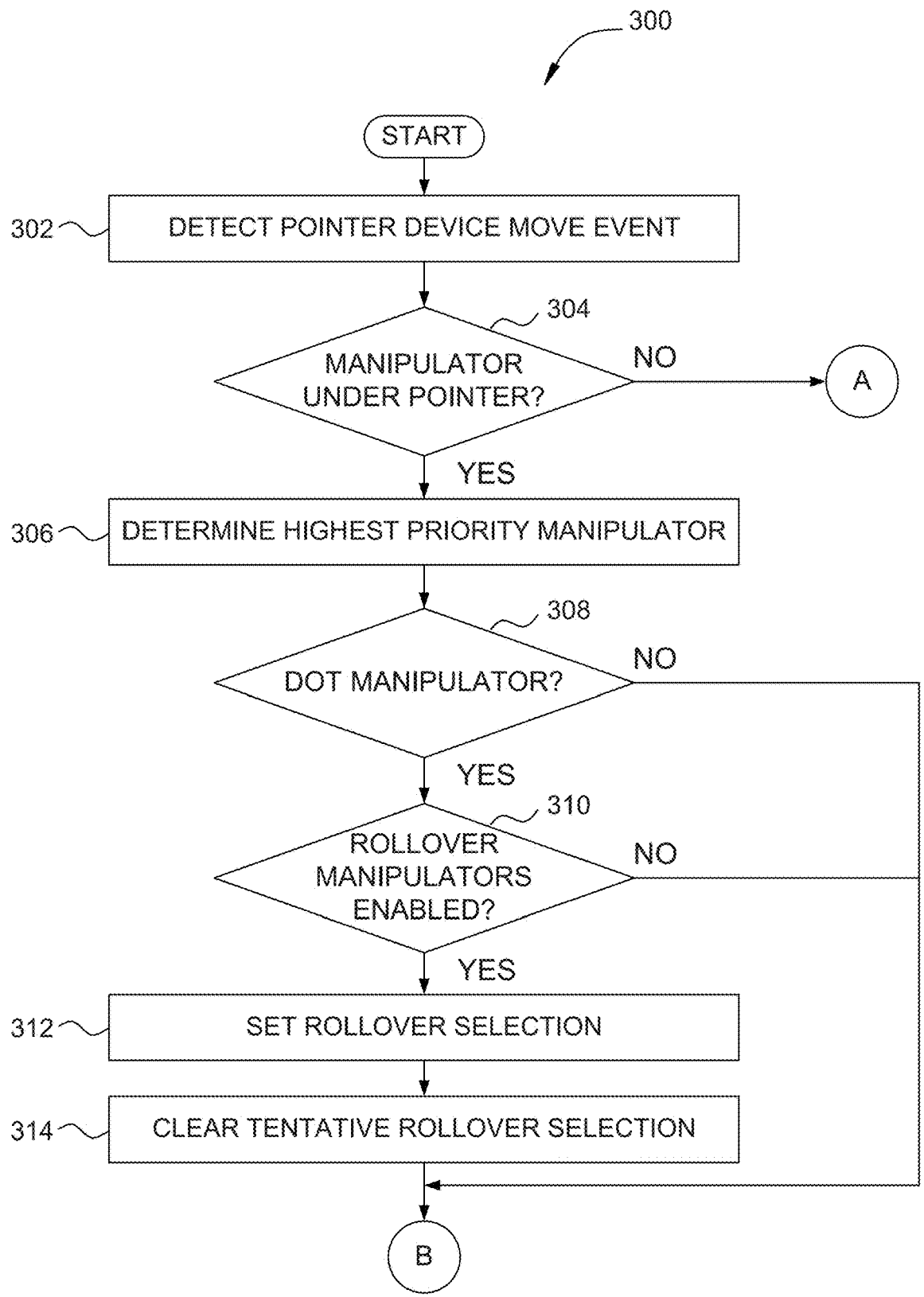
FIGS. 3A-3C set forth a flow diagram of method steps for processing a pointer device move event, according to one embodiment.
Figure 3B:
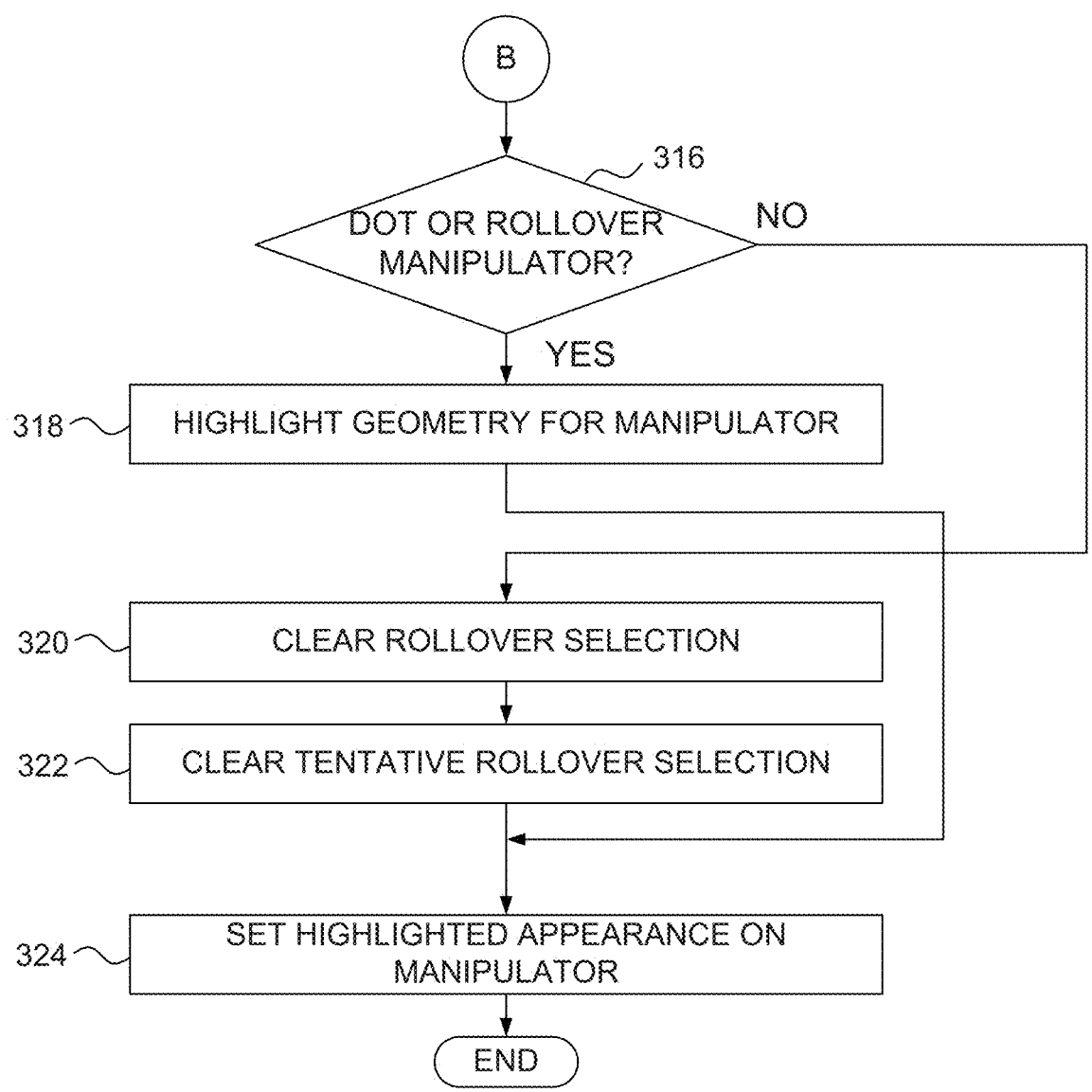
Figure 3C:
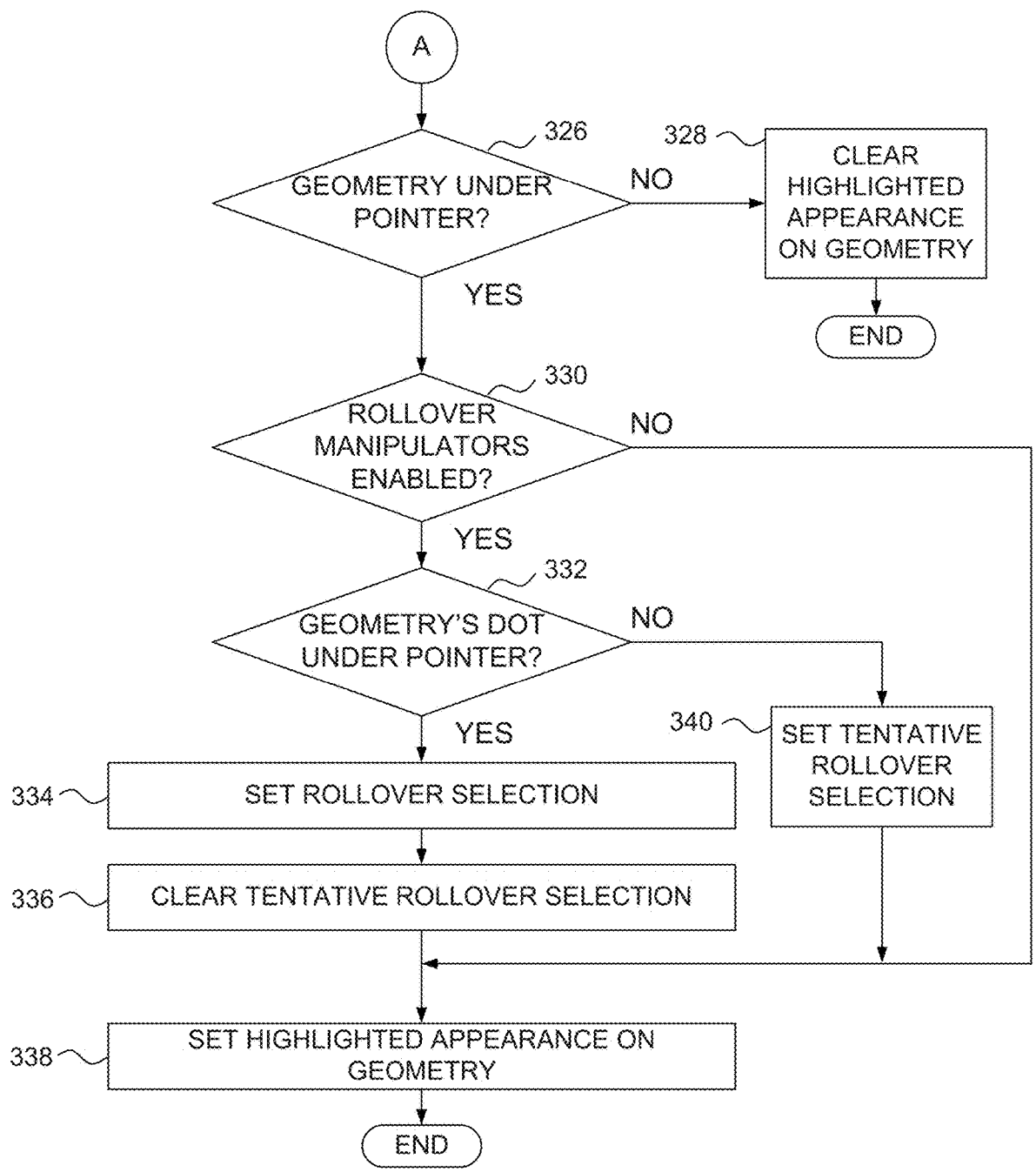

FIGS. 3A-3C illustrate a method 300 for processing a move event, according to one embodiment. Although described in conjunction with the systems of FIGS. 1 and 7, persons of ordinary skill in the art will understand that any system configured to perform the method steps, in any order, is within the scope of the present disclosure.

As shown, method 300 begins at step 302, where the move handler engine 120 detects a pointer device move event. In one embodiment, the move handler engine 120 detects the pointer device move event by receiving notification of the device move event from the event delivery engine 110. The move handler then determines whether the move event represents a rollover selection of a manipulator. At step 304, the move handler engine 120 determines whether a manipulator is under a particular pixel location of interest, typically the current pointer location. In some embodiments, the move handler engine 120 determines whether a manipulator is under the pointer by sending a request to the manipulator picking engine 140 to return the set of manipulators at the current point location. If there is a manipulator under the pointer, then the move of the pointer to the current location represents a rollover. The method 300 proceeds to step 306, where the move handler engine 120 determines a highest priority manipulator of the one or more manipulators that intersect at the current pointer location. In some embodiments, the move handler engine 120 determines which manipulator is the highest priority manipulator by sending a request to the pick prioritization engine 160 to return the highest priority manipulator at the current pointer location.

At step 308, the move handler engine 120 determines whether the highest priority manipulator is a dot manipulator. If the highest priority manipulator is a dot manipulator, then the method proceeds to step 310, where the move handler engine 120 determines whether rollover manipulators are enabled. In one embodiment, rollover manipulators may be enabled or disabled by setting a user setting or a user preference. If rollover manipulators are enabled, then the method proceeds to step 312, where the move handler engine 120 sets the rollover selection in the selection state data 150 to link the rollover selection with the portion of geometry associated with the dot manipulator at the current pointer location. Setting the rollover selection indicates that the associated dot manipulator is to be drawn into the display memory. At step 314, the move handler engine 120 clears the tentative rollover selection in the selection state data 150. In some embodiments, a tentative rollover selection may have been previously set if the pointer location is placed over the edge of a portion of geometry that has an associated dot manipulator, but not over the dot manipulator itself. Because the rollover selection has now been set, there is no longer a need to retain a previous tentative rollover selection, if any.

At step 316, the move handler engine 120 determines whether the highest priority manipulator is either a dot manipulator or a rollover manipulator. If the highest priority manipulator is either a dot manipulator or a rollover manipulator, then the method proceeds to step 318, where the move handler engine 120 highlights the portion of geometry associated with the manipulator, to visually identify the portion of geometry. This step ensures that the rollover or dot manipulator is correctly highlighted, even if the current pointer position is not over the associated portion of geometry. At step 324, the move handler engine 120 sets a highlighted appearance for the manipulator itself. The method 300 then terminates.

Returning to step 316, if the highest priority manipulator is neither a dot manipulator nor a rollover manipulator, then the highest priority manipulator is a standard manipulator (e.g. a manipulator selected via a mouse click). Such a standard manipulator takes precedence over both rollover manipulators and dot manipulators. Therefore, the method proceeds to step 320, where the move handler engine 120 clears the rollover selection in the selection state data 150 based on the current pointer location of the pointer device. At step 322, the move handler engine 120 clears the tentative rollover selection in the selection state data 150. At step 324, the move handler engine 120 sets a highlighted appearance for the manipulator. The method 300 then terminates.

Returning to step 310, if rollover manipulators are not enabled, then the method proceeds to step 316, described above.

Returning to step 308, if the highest priority manipulator is not a dot manipulator, then the method proceeds to step 316, described above.

Returning to step 304, if there is not a manipulator under the pointer, then the method 300 proceeds to step 326, where the move handler engine 120 determines whether any portion of geometry is under the current pointer location. In some embodiments, the move handler engine 120 may send a request to the geometry picking engine 170 to obtain the portion of geometry at the current pointer location. If more than one portion of geometry intersects with the current pointer location, then the geometry picking engine 170 returns the portion of geometry closest to the surface of the display, based on depth information. If a portion of geometry is under the pointer, then the method proceeds to step 330, where the move handler engine 120 determines whether rollover manipulators are enabled. If so, then at step 332, the move handler engine 120 determines whether the current pointer location is over a dot manipulator associated with the portion of geometry. If so, then at step 334, the move handler engine 120 sets the rollover selection in the selection state data 150 based on the location of the current pointer location. At step 336, the move handler engine 120 clears the tentative rollover selection in the selection state data 150. At step 338, the move handler engine 120 sets a highlighted appearance on the portion of geometry. The method 300 then terminates.

Returning to step 332, if the current pointer location is not over a location where a dot manipulator associated with the portion of geometry would be displayed, then at step 340, the move handler engine 120 sets a tentative rollover selection in the selection state data 150. At step 338, the move handler engine 120 sets a highlighted appearance on the portion of geometry. The method 300 then terminates.

Returning to step 330, if rollover manipulators are not enabled, then the method 300 proceeds to step 338, described above.

Returning to step 326, if no portion of geometry is under the pointer, then the current pointer location does not intersect any manipulator or portion of geometry. The method proceeds to step 328, where the move handler engine 120 clears the highlighted appearance for the portion of geometry, so no portion of geometry is highlighted. In some embodiments, if the current pointer position is completely outside of the view area for the animation application program, then the move handler engine 120 may also clear all rollover and tentative rollover manipulators. The method 300 then terminates.

Figure 4A:
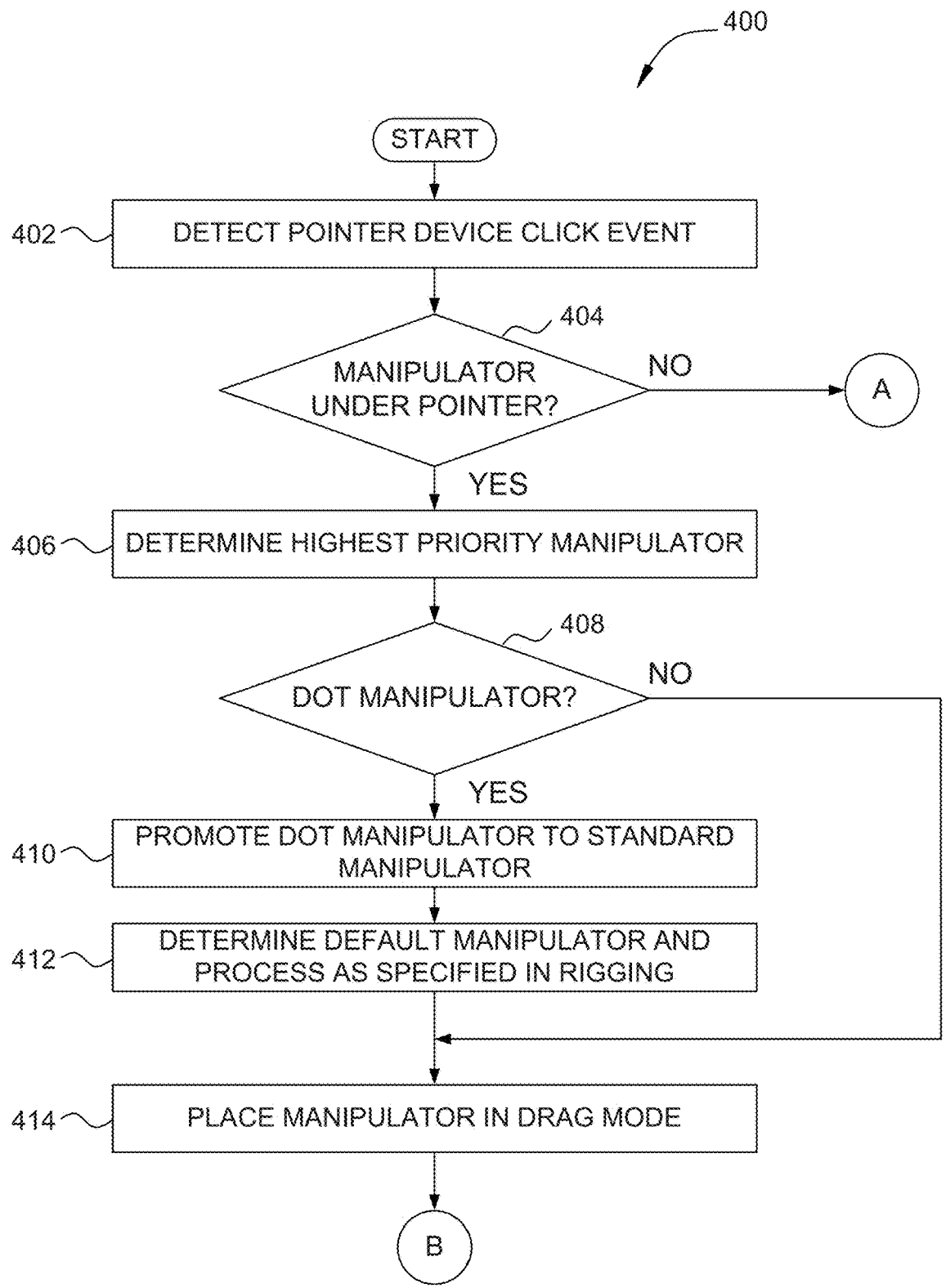
FIGS. 4A-4B set forth a flow diagram of method steps for processing a pointer device click event, according to one embodiment.
Figure 4B:
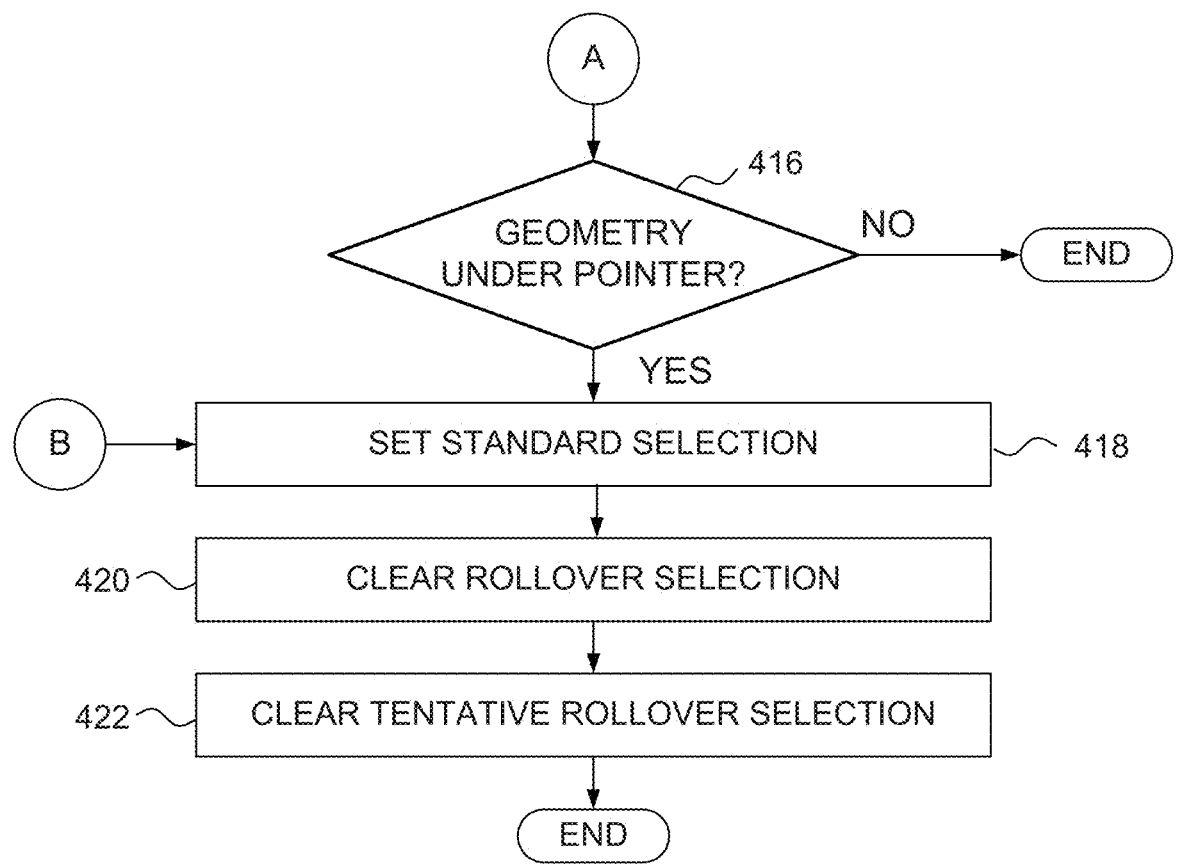

FIGS. 4A-4B illustrate a method 400 for processing a click event, according to one embodiment. Although described in conjunction with the systems of FIGS. 1 and 7, persons of ordinary skill in the art will understand that any system configured to perform the method steps, in any order, is within the scope of the present disclosure.

As shown, method 400 begins at step 402, where the click handler engine 130 detects a pointer device click event. In one embodiment, the click handler engine 130 detects the pointer device move event by receiving notification of the device click event from the event delivery engine 110. At step 404, the click handler engine 130 determines whether a manipulator is under the pointer location associated with the click event. In some embodiments, the click handler engine 130 determines whether a manipulator is under the pointer by sending a request to the manipulator picking engine 140 to return the set of manipulators at the current pointer location. If a manipulator is under the pointer, then at step 406, the click handler engine 130 determines the manipulator under the clicked location (if more than one) that has the highest priority. In some embodiments, the click handler engine 130 determines which manipulator is the highest priority manipulator by sending a request to the pick prioritization engine 160 to return the highest priority manipulator at the current pointer location.

At step 408, the click handler engine 130 determines whether the highest priority manipulator is a dot manipulator. If so, then the click handler engine 130 promotes the dot manipulator into a standard manipulator (step 410). Step 410 corresponds to the mode where a dot manipulator does not become a standard manipulator until clicked on. At step 412, the click handler engine 130 identifies a default manipulator handle for an associated portion of geometry, as specified in the rigging data. This determination, in turn, controls which parameter is adjusted if the dot itself is moved on the display surface. At step 414, the default manipulator is placed in drag mode, so that the related parameters may be adjusted via a graphical user interface. At step 418, the click handler engine 130 sets the standard selection to be the default manipulator established for the portion of geometry under the pointer. At step 420, the click handler engine 130 clears any rollover selection that was previously set, (e.g. in step 312 or step 344 of method 300 for a previous move event). At step 422, the click handler engine 130 clears any tentative rollover selection that was previously set, (e.g. in step 340 of method 300 for a previous move event). The method 400 then terminates.

Returning to step 408, if the highest priority manipulator is not a dot manipulator, the method proceeds to step 414, described above.

Returning to step 404, if there is no manipulator at the current point location, then the click handler engine 130 determines whether any portion of geometry is under the pointer location (step 416). If there is no geometry under the pointer location, then the click event does not correspond to any manipulator or portion of geometry. The method 400 terminates.

If, on the other hand, geometry is present under the pointer location, then the method 400 proceeds to step 418, described above.

Figure 5:
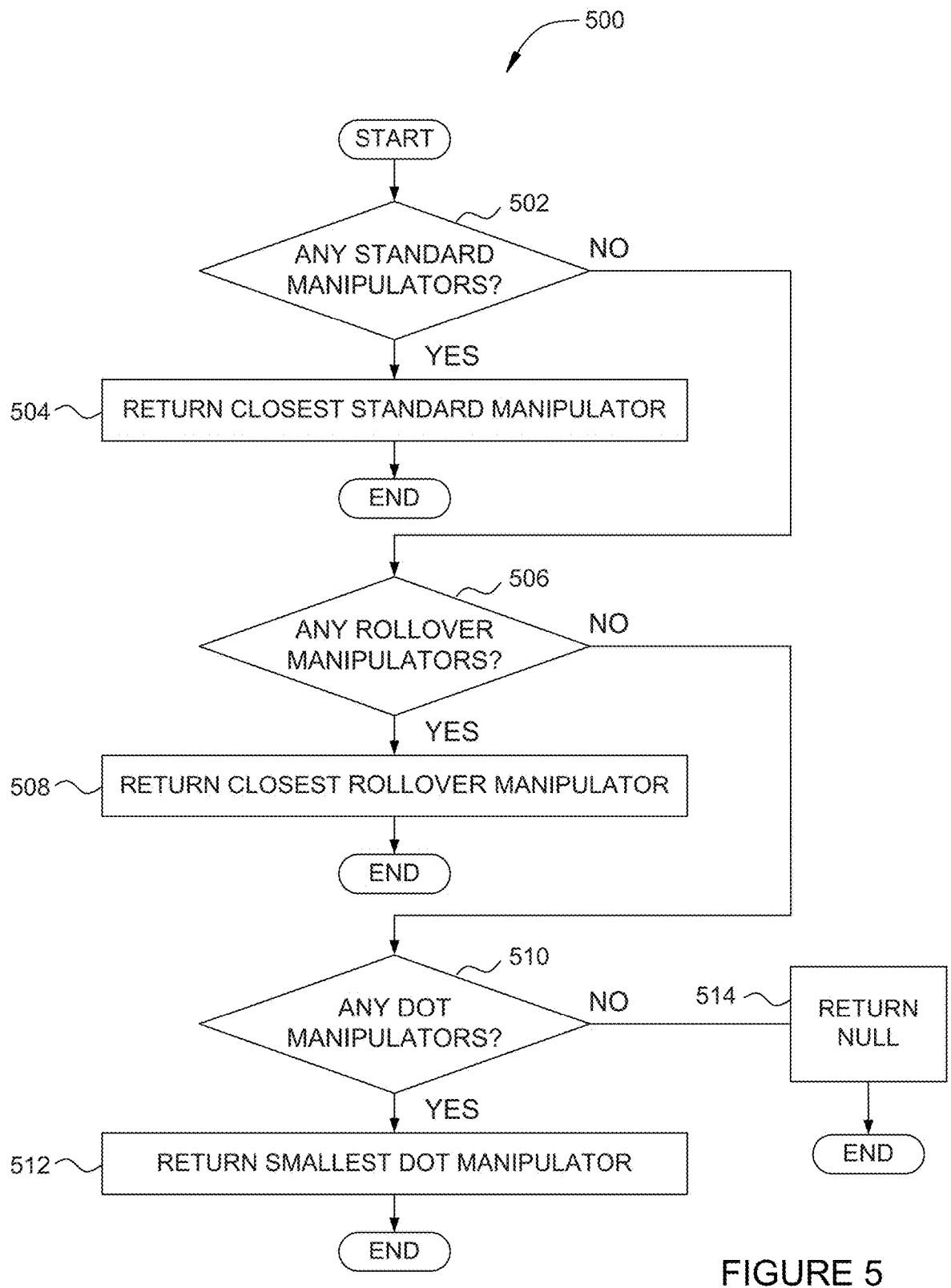
FIG. 5 sets forth a flow diagram of method steps for selecting a manipulator from a group of associated manipulators, according to one embodiment.

FIG. 5 illustrates a method 500 for selecting a manipulator from a group of associated manipulators, according to one embodiment. Although described in conjunction with the systems of FIGS. 1 and 7, persons of ordinary skill in the art will understand that any system configured to perform the method steps, in any order, is within the scope of the present disclosure.

As shown, method 500 begins at step 502, where the pick prioritization engine 160 determines whether any standard manipulators are present at a current pointer location. If so, the pick prioritization engine 160 returns the standard manipulator that is closest to the display surface, based on depth information, as the highest priority manipulator at the current pointer location (step 504). The method 500 then terminates.

Alternatively, if there are no standard manipulators at the current pointer location, then the pick prioritization engine 160 determines whether there are any rollover manipulators at the current pointer location (step 506). If there are any rollover manipulators at the current pointer location, then the pick prioritization engine 160 returns the rollover manipulator that is closest to the display surface, based on depth information, as the highest priority manipulator at the current pointer location (step 508). The method 500 then terminates.

Returning to step 506, if no rollover manipulators are at the current pointer location, then the pick prioritization engine 160 determines whether there are any dot manipulators at the current pointer location (step 510). If so, the pick prioritization engine 160 returns the dot manipulator that is smallest in size, as displayed on the display surface, based on depth information, as the highest priority manipulator at the current pointer location (step 512). The method 500 then terminates.

If, there are no dot manipulators at the current pointer location (at step 510), then the pick prioritization engine 160 returns a null value, indicating that there are no manipulators at the current pointer location (step 514). The method 500 then terminates.

By performing the method steps as described above and shown in FIG. 5, the pick prioritization engine 160 gives the highest priority to standard manipulators, followed by rollover manipulators, followed by dot manipulators. However, the pick prioritization engine 160 may utilize other relative priority orders within the scope of the present disclosure.

Figure 6:
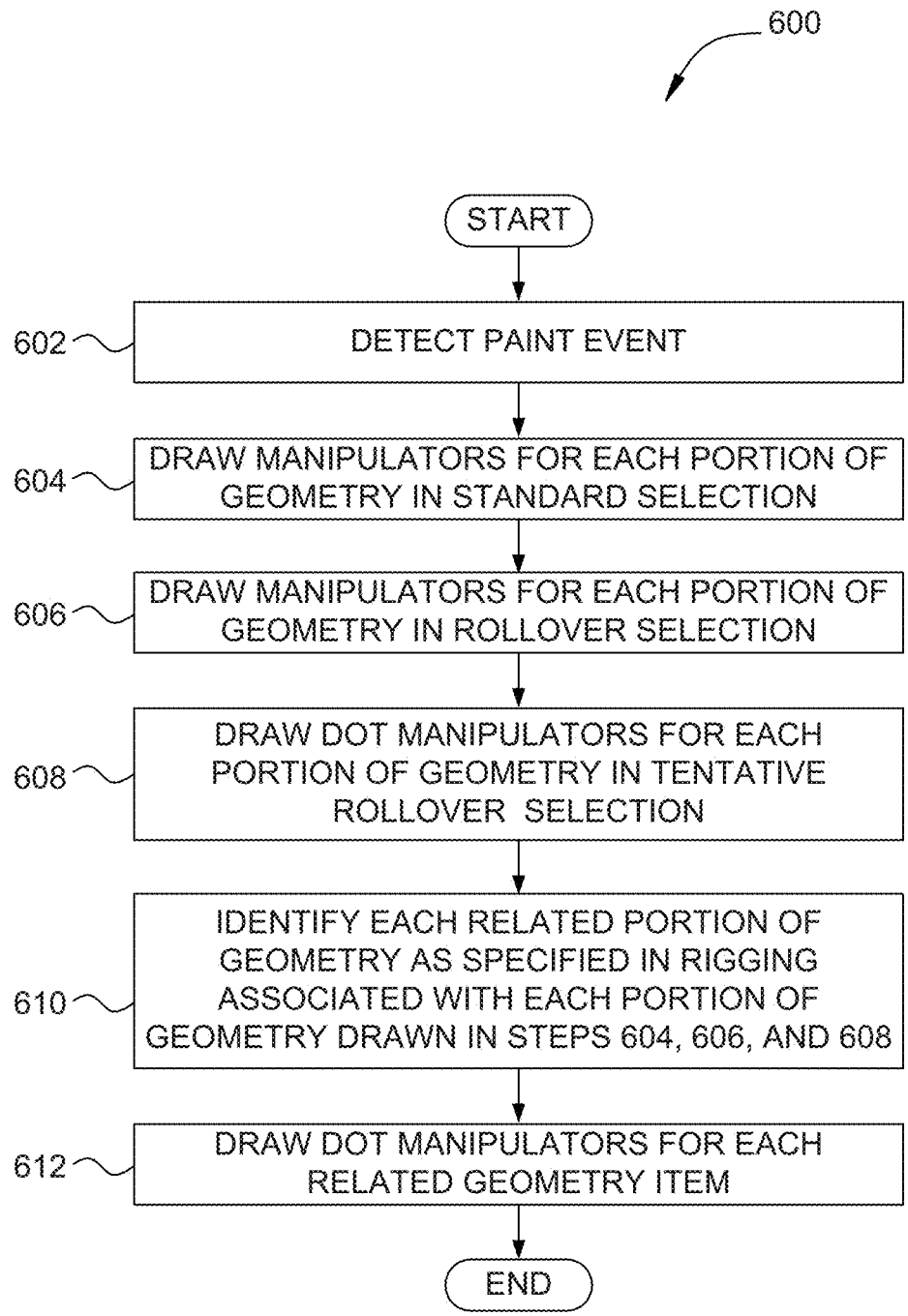
FIG. 6 sets forth a flow diagram of method steps for drawing one or more manipulators on a graphical user interface, according to one embodiment.

FIG. 6 illustrates a method 600 for drawing one or more manipulators on a graphical user interface, according to one embodiment. Although described in conjunction with the systems of FIGS. 1 and 7, persons of ordinary skill in the art will understand that any system configured to perform the method steps, in any order, is within the scope of the present disclosure.

As shown, method 600 begins at step 602, where the manipulator display engine 180 and the dot manipulator display engine 190 detect a paint event, indicating a command to draw manipulators and geometry into the display memory. In one embodiment, the manipulator display engine 180 and the dot manipulator display engine 190 detect the paint event by receiving notification of the paint event from the event delivery engine 110. At step 604, the manipulator display engine 180 draws manipulators for each geometry item associated with an active standard selection, where a standard selection represents a manipulator selected in response to a click event. At step 606, the manipulator display engine 180 draws manipulators for each geometry item associated with an active rollover selection, where a rollover selection represents a manipulator selected in response to a move event to a central region of a portion of geometry. At step 608, the dot manipulator display engine 190 draws dot manipulators for each geometry item associated with a tentative rollover selection, where a tentative rollover selection represents a manipulator selected in response to a move event to a perimeter region of a portion of geometry.

At step 610, the dot manipulator display engine 190 identifies related portions of geometry associated with each portion of geometry in standard selection, rollover selection, and tentative rollover selection, as identified in steps 604, 606, and 608, respectively. Typically, these related portions of geometry are specified in the rigging information for the animatable object. For example, a pair of lips on an animatable character could include a left, center, and right portion for each of the upper lip and lower lip, resulting in six distinct portions of geometry associated with the pair of lips. The rigging information for the pair of lips would identify each of the six portions of geometry as related to each of the other five portions of geometry for the pair of lips. As a result, when the dot manipulator display engine 190, at steps 604, 606, and 608, would draw the manipulators for any one of the five portions of geometry associated with the pair of lips, the dot manipulator display engine 190 would then identify, at step 610, the other five portions of geometry associated with the pair of lips. At step 612, the dot manipulator display engine 190 draws dot manipulators for each of the identified related geometry items. By displaying the dot manipulators for all related portions of geometry, an animator may move the current pointer location to any dot manipulator for any portion of geometry in the group of related portions of geometry without clicking on any portion of geometry. As a result, the animator need not perform a pointer device click for the sole purpose of selecting a portion of geometry or manipulator, although the animator does click on a manipulator in order to drag, and thus adjust, that manipulator. In this way, the number of clicks performed by an animator during the process of animation may be reduced. The method 600 then terminates.

Figure 7:
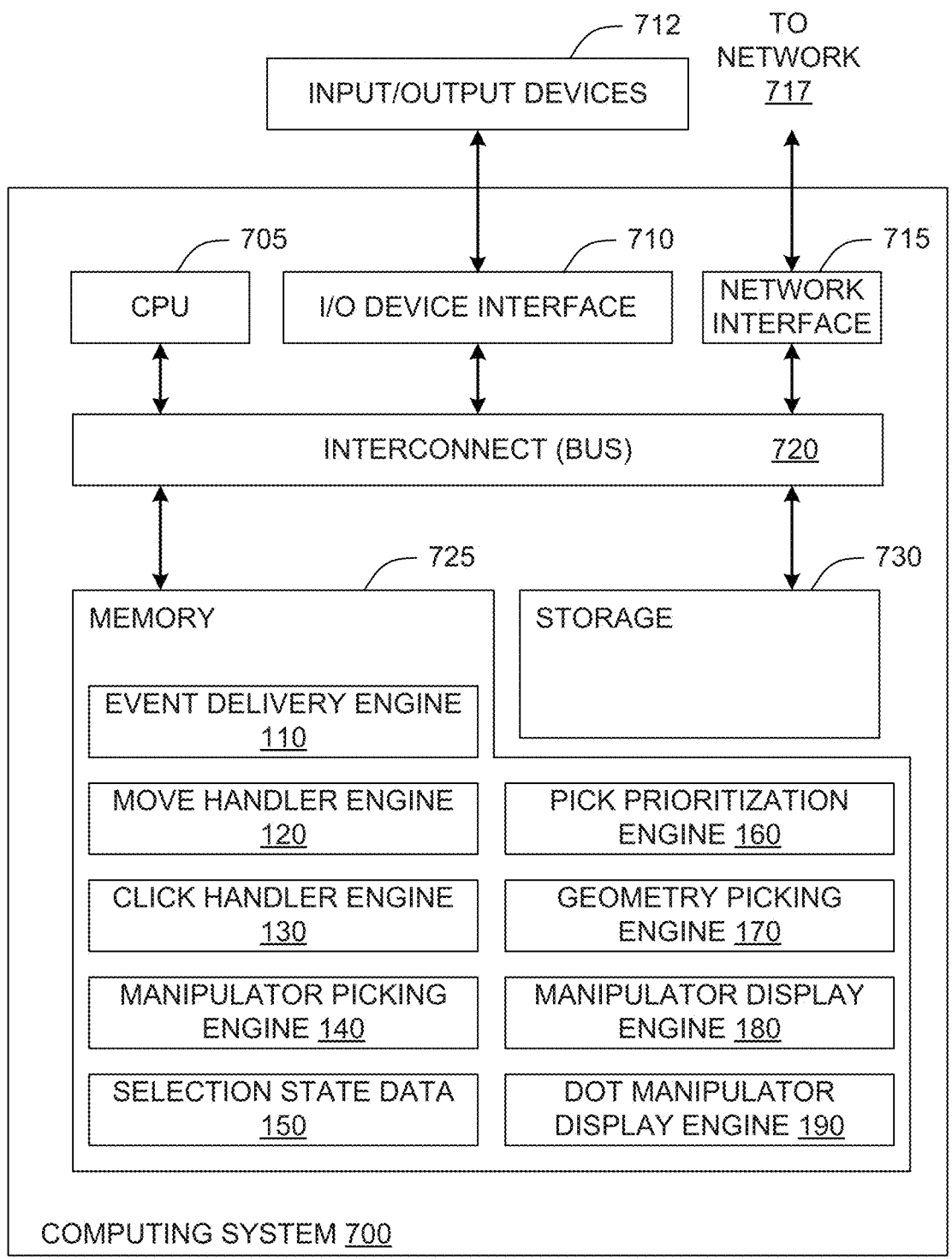
FIG. 7 illustrates an example computing system configured to process dot-based manipulators, according to one embodiment.

FIG. 7 illustrates an example computing system 700 configured to process dot-based manipulators, according to one embodiment. As shown, the computing system 700 includes, without limitation, a central processing unit (CPU) 705, a network interface 715, a network interface 715, a memory 720, and storage 730, each connected to a bus 717. The computing system 700 may also include an I/O device interface 710 connecting I/O devices 712 (e.g., keyboard, display and mouse devices) to the computing system 700. Further, in context of this disclosure, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 730. The interconnect 717 is used to transmit programming instructions and application data between the CPU 705, I/O devices interface 710, storage 730, network interface 715, and memory 720. Note, CPU 705 is included to be representative of a single CPU, multiple CPUs, a single CPU having multiple processing cores, and the like. And the memory 720 is generally included to be representative of a random access memory. The storage 730 may be a disk drive storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an event delivery engine 110, a move handler engine 120, a click handler engine 130, a manipulator picking engine 140, selection state data 150, a pick prioritization engine 160, a geometry picking engine 170, a manipulator display engine 180, and a dot manipulator display engine 190, as further described in conjunction with FIG. 1.

As described, embodiments presented herein provide techniques for displaying rollover manipulators and dot manipulators associated with an animatable 3D object that appears within a window of an animation application program executing on an animation system. The rollover manipulators and dot manipulators appear when a pointer is positioned over particular portions of geometry within a 3D object, without first clicking on, or otherwise selecting, a portion of geometry. Various manipulators appear, are highlighted, and disappear as the position of the pointer device moves along the surface of the 3D object, even without generating a click event. Advantageously, animation of the 3D object is accomplished with significantly fewer clicks of the pointer device. As a result, the animation process proceeds with greater efficiency, and the risk of user fatigue and repetitive stress injury may be reduced.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function (s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A method for permitting manipulation of an animatable object, the method comprising:

detecting that a pointer device has positioned a pointer at a first location coinciding with a first portion of geometry of the animatable object, wherein the first location does not coincide with any predefined location of one or more first manipulators associated with the first portion of geometry;

responsive to the detecting that the pointer device has positioned the pointer at the first location:

tentatively selecting the one or more first manipulators associated with the first portion of geometry, and prior to receiving a selection event from the pointer device, displaying a respective representation of each of the one or more tentatively selected first manipulators, wherein the respective representation of each of the one or more tentatively selected first manipulators is displayed without displaying representations of corresponding handles used to control parameters associated with the first portion of geometry;

detecting that at least one of the one or more first manipulators is associated with one or more related manipulators;

displaying a respective representation of each of the one or more related manipulators; and responsive to a selection of one of the one or more first manipulators that are tentatively selected, displaying representations of one or more handles corresponding to the one of the one or more first manipulators and used to control parameters associated with the first portion of geometry.

2. The method of claim 1, further comprising:

detecting that the pointer device has positioned the pointer at a second location coinciding with a first related manipulator included in the one or more related manipulators; and indicating that the first related manipulator is selected via rollover selection.

3. A non-transitory computer-readable storage medium including instructions that, when executed by a processing unit, cause the processing unit to permit manipulation of an animatable object, by performing steps comprising:

detecting that a pointer device has positioned a pointer at a first location coinciding with a first portion of geometry of the animatable object, wherein the first location does not coincide with any predefined location of one or more first manipulators associated with the first portion of geometry;

responsive to the detecting that the pointer device has positioned the pointer at the first location:

tentatively selecting the one or more first manipulators associated with the first portion of geometry, and prior to receiving a selection event from the pointer device, displaying a respective representation of each of the one or more tentatively selected first manipulators, wherein the respective representation of each of the one or more tentatively selected first manipulators is displayed without displaying representations of corresponding handles used to control parameters associated with the first portion of geometry;

detecting that at least one of the one or more first manipulators is associated with one or more related manipulators;

displaying a respective representation of each of the one or more related manipulators; and responsive to a selection of one of the one or more first manipulators that are tentatively selected, displaying representations of one or more handles corresponding to the one of the one or more first manipulators and used to control parameters associated with the first portion of geometry.

4. The non-transitory computer-readable storage medium of claim 3, the steps further comprising:

detecting that the pointer device has positioned the pointer at a second location coinciding with a first related manipulator included in the one or more related manipulators; and indicating that the first related manipulator is selected via rollover selection.

* * * * *